United States Patent
Jayawardena et al.

(10) Patent No.: US 10,681,611 B1
(45) Date of Patent: Jun. 9, 2020

(54) METHOD AND APPARATUS FOR MANAGING COMMUNICATION ROUTINGS IN A COMMUNICATION SYSTEM

(71) Applicant: AT&T Intellectual Property I, L.P., Atlanta, GA (US)

(72) Inventors: Thusitha Jayawardena, Holmdel, NJ (US); Christopher Van Wart, Ocean, NJ (US); Donald Levy, Holmdel, NJ (US); Cristina Serban, Middletown, NJ (US); David Gross, South River, NJ (US); Deon Ogle, Atlanta, GA (US); Shawn Hiemstra, Flowery Way, GA (US); Jayaraman Ramachandran, Plainsboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/193,379

(22) Filed: Nov. 16, 2018

(51) Int. Cl.
*H04W 40/24* (2009.01)
*H04W 40/02* (2009.01)
*H04W 84/04* (2009.01)
*H04W 84/12* (2009.01)

(52) U.S. Cl.
CPC ......... *H04W 40/248* (2013.01); *H04W 40/02* (2013.01); *H04W 84/042* (2013.01); *H04W 84/12* (2013.01)

(58) Field of Classification Search
CPC . H04W 40/248; H04W 40/02; H04W 84/042; H04W 84/12
See application file for complete search history.

(56) References Cited

U.S. PATENT DOCUMENTS

| 9,019,974 B2 | 4/2015 | Mccann et al. |
| 9,392,126 B2 | 7/2016 | Goldner et al. |
| 9,521,077 B2 | 12/2016 | Carames et al. |
| 9,949,130 B2 | 4/2018 | Ophir et al. |
| 9,955,345 B2 | 4/2018 | Swissa et al. |
| 2013/0069834 A1* | 3/2013 | Duerksen ................. H01Q 1/32 343/711 |
| 2015/0350912 A1 | 12/2015 | Head et al. |
| 2016/0302132 A1 | 10/2016 | Patrikios et al. |
| 2016/0365893 A1* | 12/2016 | Bennett .................... H04L 5/14 |
| 2017/0094512 A1 | 3/2017 | Kiss et al. |

(Continued)

*Primary Examiner* — Kashif Siddiqui
(74) *Attorney, Agent, or Firm* — Guntin & Gust, PLC; Eduardo Guntin

(57) ABSTRACT

Aspects of the subject disclosure may include, for example, determining a first access point name according to a first service set identifier associated with a first wireless message transmitted according to a first wireless protocol from a first device, where the first access point name is included in a set of access point names of a cellular communication system, and transmitting a second wireless message according to a second wireless protocol to a communication node of a guided wave communication system, where the guided wave communication system is communicatively coupled to the cellular communication system, where the second wireless message is associated with the first wireless message and includes the first access point name, and where the cellular communication system determines a first routing of first communications associated with the first device according to first access point name. Other embodiments are disclosed.

20 Claims, 13 Drawing Sheets

(56) References Cited

U.S. PATENT DOCUMENTS

2017/0264454 A1 9/2017 Kekki
2017/0339097 A1 11/2017 Simon et al.
2017/0374695 A1 12/2017 Lau et al.
2018/0084409 A1 3/2018 Rappard

* cited by examiner

300

METHOD AND APPARATUS FOR MANAGING COMMUNICATION ROUTINGS IN A COMMUNICATION SYSTEM

CROSS-REFERENCE TO RELATED APPLICATIONS

This application references U.S. patent application Ser. No. 14/519,343, filed Oct. 21, 2014, now U.S. Pat. No. 9,780,834. The contents of the foregoing are hereby incorporated by reference into this application as if set forth herein in full.

FIELD OF THE DISCLOSURE

The subject disclosure relates to a method and apparatus for managing communication routings in a communication system.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1:
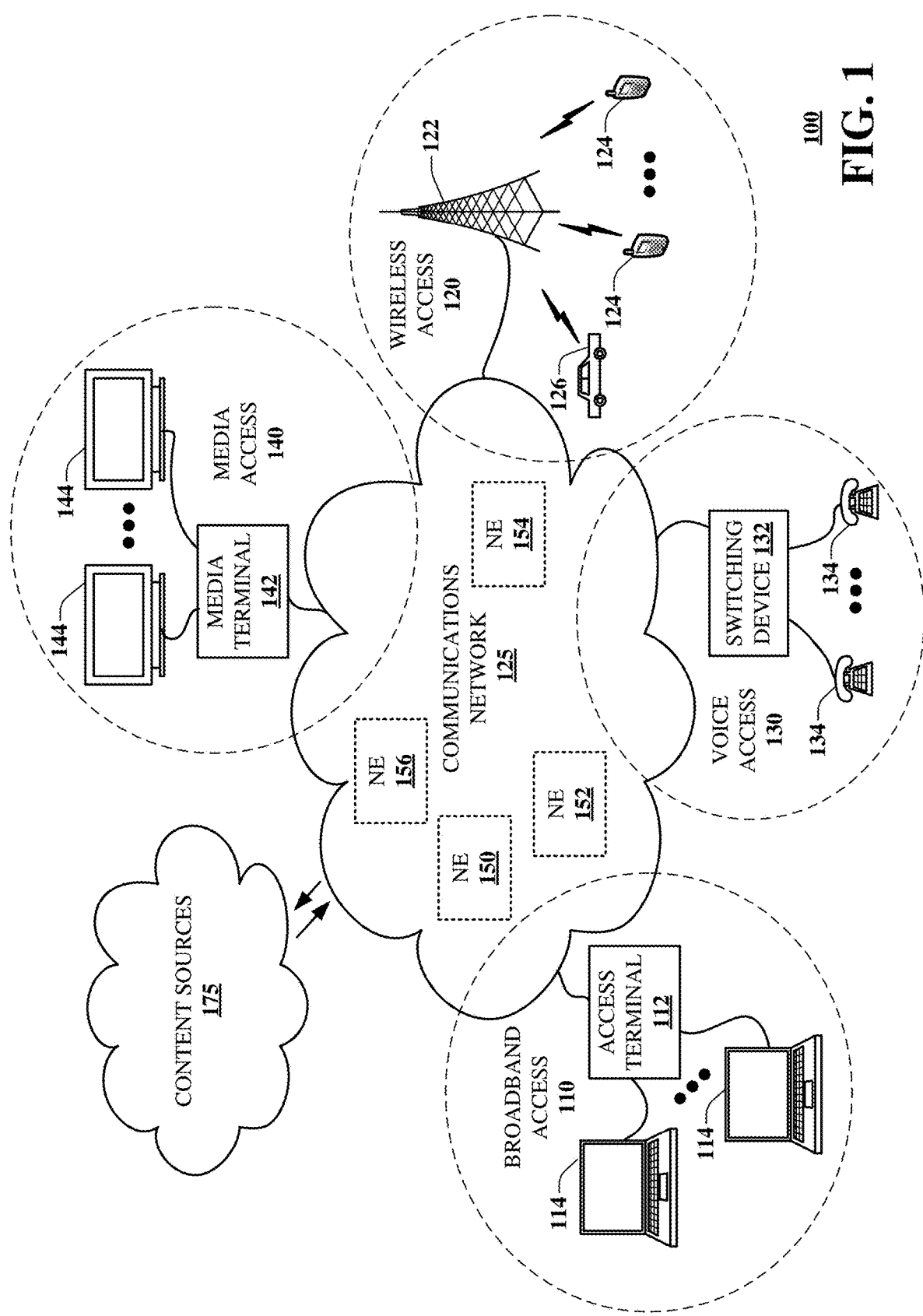
FIG. 1 is a block diagram illustrating an example, non-limiting embodiment of a communications network in accordance with various aspects described herein.

The subject disclosure describes, among other things, illustrative embodiments for a method and an apparatus for identifying a device and/or an application running at a device with a service set identifier (SSID). The SSID can be one of several SSIDs supported by a router managing a Wi-Fi Local Area Network (WLAN) and can be based on one or more requirements of the device and/or application. An SSID-to-APN table can be used to translate the SSID into a corresponding APN for a cellular communication system. A message can be sent to a communication node of a guided wave communication system that is coupled to the cellular communication system. The cellular communication system can use the APN to select a routing gateway and associated network for meeting the requirements of the device and/or application.

One or more aspects of the subject disclosure include a routing device, including a Wi-Fi wireless transceiver, a cellular wireless transceiver; a processing system including a processor communicatively coupled to the Wi-Fi wireless transceiver and the cellular wireless transceiver, and a memory that stores executable instructions that, when executed by the processing system, facilitate performance of operations. The operations can include receiving, by the Wi-Fi wireless transceiver, a first message from a first device. The first message can include a first service set identifier, and the first service set identifier can be included in a set of service set identifiers of a wireless local area network facilitated by the routing device. The operations can also include determining a first access point name according to the first service set identifier of the first message. The first access point name can be included in a set of access point names of a cellular communication system. The operations can further include transmitting, by the cellular wireless transceiver, a second message to a communication node of a guided wave communication system. The guided wave communication system can be communicatively coupled to the cellular communication system. The second message can be associated with the first message and can include the first access point name. The cellular communication system can determine a first routing of first communications associated with the first device according to first access point name. The first routing of the first communications associated with the first device can include a first packet data network gateway associated with the first access point name.

One or more aspects of the subject disclosure include a machine-readable medium, comprising executable instructions that, when executed by a processing system including a processor, facilitate performance of operations. The operations can include receiving, by a Wi-Fi wireless transceiver, a first message from a first device. The first message can include a first service set identifier, and the first service set identifier can be included in a set of service set identifiers of a wireless local area network. The operations can include determining a first access point name according to the first service set identifier of the first message. The first access point name can be included in a set of access point names of a cellular communication system. The operations can further include transmitting, by the Wi-Fi wireless transceiver, a second message to a communication node of a guided wave communication system. The guided wave communication system can be communicatively coupled to the cellular communication system. The second message can be associated with the first message and can include the first access point name. The cellular communication system can determine a first routing of first communications associated with the first device according to first access point name.

One or more aspects of the subject disclosure include a method. The method can include determining, by a processing system including a processor, a first access point name according to a first service set identifier associated with a first wireless message transmitted according to a first wireless protocol from a first device. The first access point name is included in a set of access point names of a cellular communication system. The method can also include transmitting, by the processing system, a second wireless message according to the second wireless protocol to a communication node of a guided wave communication system. The guided wave communication system can be communicatively coupled to the cellular communication system. The second wireless message can be associated with the first wireless message and can include the first access point name. The cellular communication system can determine a first routing of first communications associated with the first device according to first access point name.

Referring now to FIG. 1, a block diagram is shown illustrating an example, non-limiting embodiment of a communications network 100 in accordance with various aspects described herein. For example, communications network 100 can facilitate in whole or in part an apparatus for performing a method for identifying a device and/or an application running at a device with a service set identifier (SSID). The SSID can be one of several SSIDs supported by a router managing a Wi-Fi Local Area Network (WLAN) and can be based on one or more requirements of the device and/or application. An SSID-to-APN table can be used to translate the SSID into a corresponding APN for a cellular communication system. A message can be sent to a communication node of a guided wave communication system that is coupled to the cellular communication system. The cellular communication system can use the APN to generate a routing gateway for meeting the requirements of the device and/or application.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, Ultra-Wideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Home networks have evolved to encompass many different types of applications. One type of application is the Internet-of-Things (IoT) device. Examples of IoT devices include appliances, home security and safety devices, and thermostat devices. High security & privacy applications are another type of application that may be used in a home network. These applications include consumer telemedicine, banking, tax filing and similar federal/state transactions, and electronic commerce (e-commerce). Other types of applications that may be accessed in home networks include social networks, such as Facebook™ or Twitter™, entertainment application, such as video streaming or gaming, and electronic learning (e-learning), such as online University classes.

Varying types of applications and/or devices may, in turn, carry varying requirements for security and routing. For example, IoT devices may not require broad or fast access to the Internet. A significant issue with Internet-connected devices, such as home cameras and other IoT devices, is the risk of Internet robot (botnet) attacks. For example, a recent malware virus, called Mirai, was a self-propagating botnet virus that was hosted in and spread from home cameras and IoT devices. The Mirai botnet created a highly-disruptive DDoS attack in 2016. In another example, banking and other confidential transactions can benefit from additional security mechanisms that prevent various types of hacking-attacks, such as "Man-in-the-Middle" (MitM) attacks.

Online delivery of medical services and/or medicine (tele-medicine) requires privacy assurances that may require special handling of data communications and/or storage. It is estimated that by 2020, due to issues of rising costs, aging population, and technological innovation, telemedicine, including remote patient monitoring, may grow to a nearly 17 billion market in the US alone. In such a situation, the need to ensure confidentiality of patient data will be a central issue. In another example, applications, such as voice-over-IP (VoIP) and/or online game play, may require very high speed and low latency, in contrast to the requirements of IoT devices or web surfing. The variety of applications in the home setting present a variety of challenges, requirements, and services. A "one size fits all" solution for Internet access cannot, typically, fulfill all of these requirements. The security requirements for home banking are very different from those for surfing the Internet.

One approach for meeting application/device specific requirements is to identify the type of the communication traffic at the network level. For example, each traffic stream can be monitored and the various types of application traffic can be identified for special routing, processing, security, and so forth. However, there are no scalable means of identifying the traffic type in the network using this approach. Therefore, most traffic types currently receive similar treatment in the network. The exceptions are real-time applications, such as VoIP and gaming, which receive priority treatment due to quality of service (QoS) information that is included in their packet headers. However, QoS markings are not broadly suitable for providing specialized routing, processing, and security based on applications/devices in carrier backbone networks, where all packets are mapped to a small number of QoS categories. The small number of QoS categories, which are dictated by the carrier backbone architecture, are not sufficient nor strategically placed for efficiently achieving differentiated routing and security treatments. An additional difficulty that is encountered in attempting to identify the type of the application traffic at the network level is that more and more applications are using end-to-end encryption.

Theoretically, a configurable home Wi-Fi router could enable configuration, by a homeowner, of an access policy that matches an application. For example, a homeowner could restrict IoT devices in the home to a subset of sites in the Internet. However, field reports of infected IoT devices using default passwords and other similar attacks on consumer electronic devices demonstrate that it is unrealistic to expect homeowners to possess the knowledge and the inclination to customized access policies in this way. Similarly, configurable routers could enable VPN-like, layer3 or layer2 separation of application traffic types via a configurable home router. However, the configurable router would be required to run complex routing protocols, and, therefore, configuration of the home router would become quite complex. Thus, it is desirable to address these issues via a system using minimal homeowner configuration and moving the complexity to the communication network, if possible.

Figure 2A:
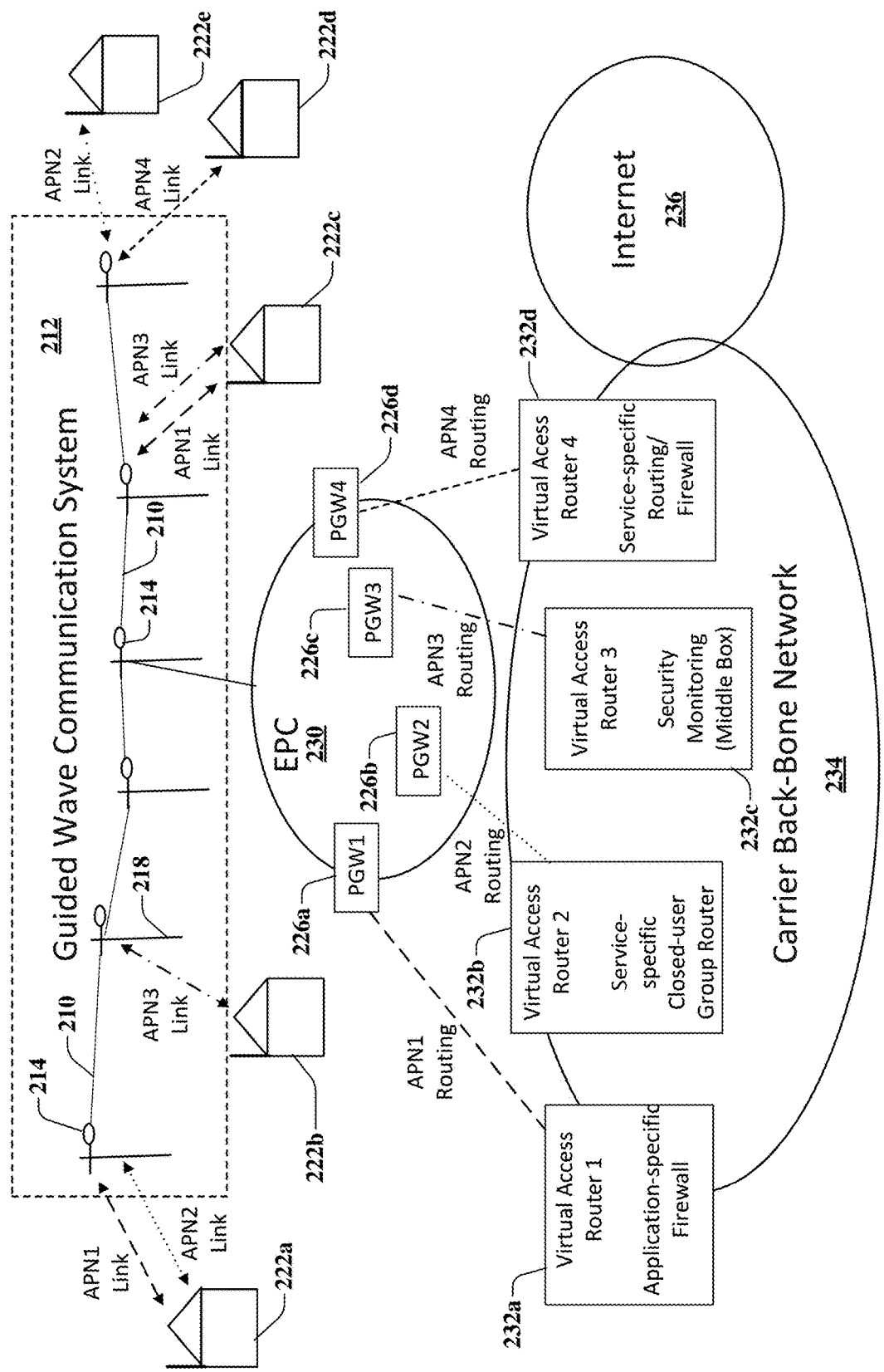
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network 100 of FIG. 1 in accordance with various aspects described herein. The system 200 can include a guided wave communication system 212. The guided wave communication system 212 can be part of a utility delivery system. For example, the guided wave communication system 212 can be part of a delivery system for electricity and/or communication signals. The guided wave communication system 212 can include a transmission medium 210 that is routed and suspended using a series of support structures 218, such as utility pole systems. The guided wave communication system 212 can include communication nodes 214 that can be distributed across the guided wave communication system 212. The communication nodes 214 can include base station devices, dielectric waveguide coupling devices, antennas for cellular wireless communication, and/or antennas for Wi-Fi wireless communication. The communication nodes 214 of the guided wave communication system 212 can allow the cellular network of the communication network 100 to be distributed and extended so that the outward edges of the cellular network can be close to a residential and/or commercial establishment 222a-e (herein referred to an establishment 222).

In one or more embodiments, the close proximity of the establishments 222 and the communication nodes 214 can allow devices and/or applications operating at establishments 222 to easily access the cellular Evolved Packet Core (EPC) 230 in order to access the services, such as the Internet 236. Because devices and/or applications at establishments 222 can easily access the EPC 230, without tying up other cellular wireless resources, the system 200 can further leverage features of the EPC, such as a facility for using multiple Access Point Names (APN), in order to provide different communication routings for different types of devices and/or applications.

In one or more embodiments, routers at the establishments 222 can select between several different APNs for different devices and/or applications that connect to the communication nodes 214. The cellular EPC 230 can then use the various APNs to determine how communications of these devices and/or applications are logically separated into different routings that can provide different services, such as firewalls, security monitoring, and closed user groups. The EPC 230 can utilize virtual network elements to provide routings in an efficient and scalable way. The EPC can route traffic via different overlay networks of Service Gateways (SGWs) and PDN (Packet Data Network) Gateways (PGWs) 226a-d (herein PGW 226). Each PGW 226 can function as a gateway to a specific network and/or the Internet. By routing user traffic via different PGWs 226, the EPC 230 can facilitate both load balancing and access to different services offered in different PDNs. In one or more embodiments, the system 200 facilitates selection of a PGWs 226 from a set of PGWs based on the APN that has been assigned to the device and/or application by the router at the establishment 222.

In one or more embodiments, each of the PGWs 226 that is assigned for routing data for a device or application according to an APN can, in turn, be connected to one or more virtual access routers (VAR) 232*a-d* (herein, called VAR 232). The VAR 232 can be located at the edge of Carrier-Back-Bone Network (CBBN) 234. These VAR 232 can enable one or more service-specific routing and security treatments of the communication traffic via, for example, service chaining. In one or more embodiments, the VAR 232 can be accessed from both subscribers of the carrier that hosts the CBBN 234 and by subscribers of other carriers. For example, VAR2 232*b* may be accessed by consumers of a type of web camera, regardless of the subscription status of those individuals. VAR2 232*b* can provide a closed-user group media experience for these consumers, where their data and, in fact, their cameras are protected from misuses, including botnet takeovers.

When a device, such as an IoT device, of an enterprise 222 connects to the EPC 230 of cellular network via a communication node 214 of the guided wave communication system 212, a mutual authentication between the device and the EPC 230 is performed. A mobile management entity (MME) can, in turn, obtain the device's APN and perform a lookup of a routing associated with the APN using, for example, a domain naming server (DNS). The MME can use the resulting routing to generate a pairing of SGW and PGW 226 to create a tunnel for packet data communications to various networks, including the CBBN 234 and the Internet 236. For example, an IoT device at enterprise 222*e* can be assigned an APN of APN2 by a router at the enterprise 222*e*. Following authentication of the IoT device, the MME of the EPC 230 can generate a routing pairing that include PGW2 226*b* and VAR2 232*b*, which results in routing communications from the IoT device at enterprise 222*e* to a Service-specific, closed-user group router VAR2 232*b* at the CBBN 234. This APN approach is used to allow the user to connect to various networks. By associating APNs (e.g., APN1, APN2, APN3, APN4, and so forth) with PGWs 226*a-d*, secure communications can be enabled for various types of devices and/or processes at enterprises 222*a-e* based on their needs.

Figure 2B:
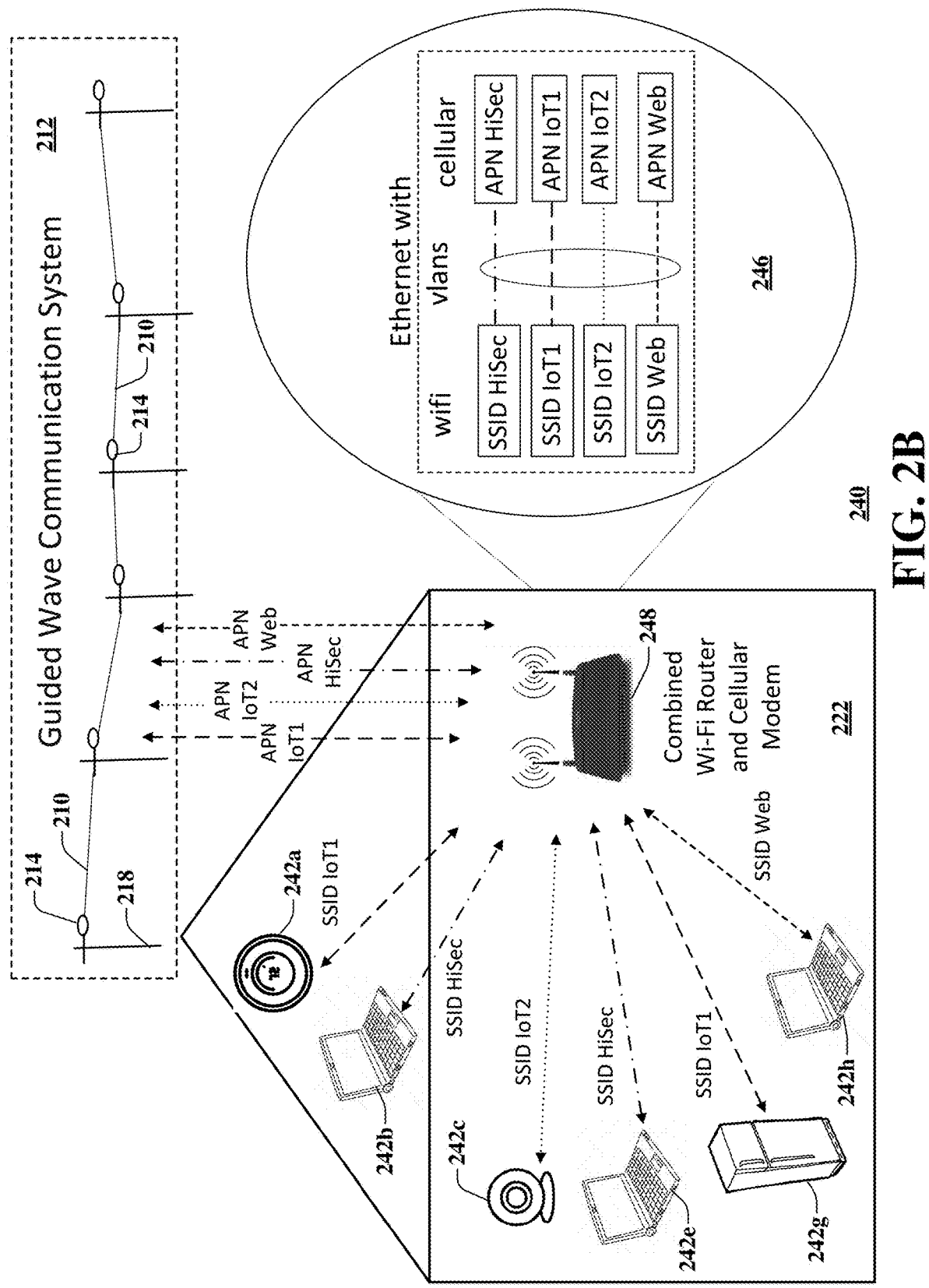
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 240 functioning within the communication network 100 of FIG. 1 in accordance with various aspects described herein. In FIG. 2B, an enterprise 222 (residence or commercial location) is shown. The enterprise 222 includes several different types of devices 242*a-h* (herein called enterprise devices 242). The enterprise devices 242 can perform a variety of functions and execute or access a variety of applications. The differing functions and applications of the enterprise devices 242 can create different types of service and security requirements for the EPC 230. For example, the enterprise 222 can include several computer devices 242*b*, 242*e*, and 242*h*. A first type of the computer device 242*h* uses a first type of applications that only require access to the Internet 236 for typical, low security types of Web activities. A second type of computer device 242*b* uses applications that access services on the CBBN 234 and/or Internet 236, such as e-commerce or tele-medicine, which require higher levels of security features (e.g., more secure firewalls, closed-groups, certificate monitoring). Similarly, different types of IoT devices 242*a*, 242*c*, and 242*g* can run applications or access services that imply different levels of performance and/or security. For example, an enterprise device 242 that is a web camera device 242*c* can, due to its ability to acquire sensitive information from within the enterprise 222, require a higher level of security than an enterprise device 242 that is a thermostat 242*a* or an appliance 242*g*.

In one or more embodiments, the enterprise 222 can include a combined, Wi-Fi Router and Cellular Modem 248 (herein called a combined router/modem). The combined modem 248 can support a wireless local area network (WLAN) for Wi-Fi communications with the enterprise devices 242. The combined router/modem 248 can also support cellular wireless communications with one or more communication nodes 214 of the guided wave communication system 212, which is connected to the EPC 230 of the cellular system. In one or more embodiments, the combined router/modem 248 can assign a set of service set identifiers (SSID) to each of the enterprise devices 242. The SSID can be a predefined set or can be custom configurable to fit the types of devices and applications associated with the enterprise devices 242. For example, the combined router/modem 248 can assign different SSIDs to handle multiple types of IoT devices 242*a*, 242*c*, and 242*g*. Similarly, the combined router/modem 248 can assign different SSIDs to handle multiple types of computer devices 242*b*, 242*e*, and 242*h*. The resulting set of SSIDs (SSID IoT1, SSID IoT2, SSID HiSec, and SSID Web) can be assigned to the enterprise devices by the combined router/modem 248. In one example, media access control (MAC) addresses can be used. When an enterprise device 242 communicates with the combine router/modem 248, the combine router/modem 248 can determine the MAC address of the enterprise device 242 and, in turn, use the MAC address to automatically assign a SSID to that device. In another example, a user can assign the SSID by accessing the combined router/modem 248 using, for example, an interface application running at a computer device 242*b*.

In one or more embodiments, the combined router/modem 248 can access an SSID-to-APN table. The SSID-to-APN table is used to map each of the SSIDs of the WLAN on the Wi-Fi side to an APN on the cellular side. The SSID-to-APN table can be maintained at the combined router/modem 248 or at a storage location accessible to the combined router/modem 248. The SSID-to-APN table can include default values and/or can be configurable by the user or by the cellular network. Each enterprise device 242 sharing a common SSID can, in turn, share a common APN. Any naming scheme can be used, however, in the example SSID-to-APN table, each SSID and APN pair shares a common name (e.g., SSID HiSec maps to APN HiSec).

In one or more embodiments, when the combined router/modem 248 initiates communications with an enterprise device 242 using the Wi-Fi WLAN, the combine router/modem 248 can assign an APN for that device 242 based on the SSID that has been assigned to that device 242 for the WLAN. The combined router/modem 248 can send this assigned APN to the EPC 230 via the communication node 214 of the guided wave communication system 212. The EPC 230 can, in turn, use the assigned APN for the enterprise device 242 to generate a communication routing, including a PGW 226. In this way, the SSID-to-APN table at the combined router/modem 248 can provide differentiated routings, security, performance, and firewalls for different types of enterprise devices 242.

In one or more embodiments, IoT device routing differentiation via SSID/APN assignments can provide excellent scaling of resources since a large number of individual home/enterprise IPs can use port address translation (PAT), which can be translated to a much smaller subset of public IPs at the set of PGWs 226. As a result, routing tables for the VAR 232 will grow much slower than the number of homes/enterprises. For example, approximately, fifty thousand IPs can be mapped to a single IP address using PAT. APN-based service selection can also demonstrate excellent scales. In one embodiment, DNS and Name Authority Pointer (NAPtr) resource record type can be used to select the overlay SGWs and PGWs 226 for routing differentiation. Each type of home/enterprise service can be allocated its own APN, and the same APN can be used by many homes/enterprises. Services can be separated at a desired granular level. For example, all IoT devices in a residential setting can be allocated a single APN used by all other residences. Alternatively, a certain type of IoT device can have its own APN. Each APN can be shared by a large number of homes/enterprises within a geographical region. In one embodiment, an IoT device manufacturer, such as a security camera manufacturer, may desire that the cameras 242c only access its servers in a closed-user group. This approach can create a plug and play capability. Some devices, like computer devices 242e, may have various applications, each of which may connect to a different APN. So, the email and banking apps get the high security APN, while the Netflix and Google app connects via the general APN.

In one or more embodiments, the guided wave communication system 212 can extend the transport network for the EPC to close proximity of enterprises 222. In this way, the enterprises 222 can provide "direct" connectivity of IoT devices to the cellular system and, more importantly, to the CBBN 234 and Internet 236. In one or more embodiments, use of APN and service slicing can be leveraged to logically separate enterprise traffic for differentiated routing and security treatment in the network. In various embodiments, each APN can signify a different PGW 226. Referring again to FIG. 2A, for example, APN1 routes through PGW1 226a to VAR1 232a that includes an application specific firewall to protect banking applications. In another example, APN2 routes through PGW2 226b to VAR2 232b, which limits access to only servers in a closed-user grouping for remote cameras but does not allow access to or from the Internet.

In one or more embodiments, the guided wave communication system 212 depicts an exemplary environment in which a dielectric waveguide coupling system can be used. Guided wave communication system 212 can comprise a first instance of a distributed system that can include communication nodes 214 that are distributed across the guided wave communication system 212. The communication nodes 214 can include base station devices, dielectric waveguide coupling devices, antennas for cellular wireless communication, and/or antennas for Wi-Fi wireless communication. The base station devices of the communication nodes 214 can be communicably coupled to a central office and/or to macrocell sites. Base station device can be connected by a wired (e.g., fiber and/or cable), or by a wireless (e.g., microwave wireless) connection to macrocell sites and the central office. The guided wave communication system 212 can be used to provide wireless voice and data services to mobile device 124 and to the residential and/or commercial establishments 222. System 200 can have additional instances of the guided wave communication system 212 for providing voice and/or data services to mobile devices 124 and establishments 222 as shown in FIG. 2A.

Macrocells can have dedicated connections to a mobile network, and base station devices can share and/or otherwise use a macrocell site's connection. A central office can be used to distribute media content and/or provide internet service provider (ISP) services to mobile devices 124 and establishments 222. The central office can receive media content from a constellation of satellites or other sources of content, and distribute such content to mobile devices 124 and establishments 222 via the guided wave communication system 212. The central office can also be communicatively coupled to the Internet 236 for providing internet data services to mobile devices 124 and establishments 222.

Communication nodes 214 can be mounted on, or attached to, utility poles 218. In other embodiments, communication nodes 214 can be near transformers and/or other locations situated nearby a power line. Communication nodes 214 can facilitate connectivity to a mobile network for mobile devices 124 and devices in establishments 222. The communication nodes 214 can include antennas, mounted on or near utility poles 218, respectively, can receive signals from base station devices at the communication nodes 214 and can transmit those signals to mobile devices 124 and establishments 222.

It is noted that FIG. 2A displays six utility support structures which can be utility poles, in each instance of the guided wave communication system 212, with one communication node 214, for purposes of simplicity. In other embodiments, utility poles 218 can have more communication nodes 214, and more utility poles 218 with distributed antennas and/or tethered connections to establishments 222.

A dielectric waveguide coupling device of a communication node 214 can transmit the signal from base station devices to antennas via utility or power line(s) that connect the utility poles 218. To transmit the signal, radio source and/or coupler up converts a signal (e.g., via frequency mixing) from a base station device or otherwise can convert the signal from the base station device to a millimeter-wave band signal and the dielectric waveguide coupling device launches a millimeter-wave band wave that propagates as a guided wave (e.g., surface wave or other electromagnetic wave) traveling along the utility line or other wire 210. At utility pole 218, another dielectric waveguide coupling device receives the guided wave (and optionally can amplify it as needed or desired or operate as a digital repeater to receive it and regenerate it) and sends it forward as a guided wave (e.g., surface wave or other electromagnetic wave) on the utility line or other wire 210. The dielectric waveguide coupling device of the communication node 214 can also extract a signal from the millimeter-wave band guided wave and shift it down in frequency or otherwise convert it to its original cellular band frequency (e.g., 1.9 GHz or other defined cellular frequency) or another cellular (or non-cellular) band frequency. An antenna of the communication node 214 can transmit (e.g., wirelessly transmit) the down-shifted signal to mobile device 124 and/or establishment 222. The process can be repeated by the dielectric waveguide coupling device, the antenna, mobile device 124 and/or establishment 222, as necessary or desirable.

Transmissions from mobile devices 124 and/or establishments 222 can also be received by antennas at communication nodes 214. Repeaters on dielectric waveguide coupling devices of communication nodes 214 can upshift or otherwise convert the cellular band signals to millimeter-wave band and transmit the signals as guided wave (e.g., surface wave or other electromagnetic wave) transmissions over the power line(s) 210 to base station devices.

Media content received by a central office can be supplied to the second instance of the guided wave communication system 212 via a base station device of a communication node 214 for distribution to mobile devices 122 and establishments 222. A dielectric waveguide coupling device of a communication node 214 can be tethered to the establishments 222 by one or more wired connections or a wireless interface. The one or more wired connections, may include without limitation, a power line, a coaxial cable, a fiber cable, a twisted pair cable, or other suitable wired mediums for distribution of media content and/or for providing internet services. In an example embodiment, the wired connections from the waveguide coupling device of a communication node 214 can be communicatively coupled to one or more very high bit rate digital subscriber line (VDSL) modems located at one or more corresponding service area interfaces (SAIs—not shown), each SAI providing services to a portion of an establishments 222. The VDSL modems can be used to selectively distribute media content and/or provide internet services to gateways (not shown) located in the establishments 222. The SAIs can also be communicatively coupled to the establishments 222 over a wired medium such as a power line, a coaxial cable, a fiber cable, a twisted pair cable, or other suitable wired mediums. In other example embodiments, the waveguide coupling device of the communication node 214 can be communicatively coupled directly to establishments 222 without intermediate interfaces such as the SAIs.

In another example embodiment, guided wave communication system 212 can employ diversity paths, where two or more utility lines 210 or other wires are strung between the utility poles 218, (e.g., for example, two or more wires 210 between poles 218) and redundant transmissions from a base station of a communication node 214 can be transmitted as guided waves down the surface of the utility lines 210 or other wires. The utility lines 210 or other wires can be either insulated or uninsulated, and depending on the environmental conditions that cause transmission losses, the coupling devices can selectively receive signals from the insulated or uninsulated utility lines 210 or other wires. The selection can be based on measurements of the signal-to-noise ratio of the wires, or based on determined weather/environmental conditions (e.g., moisture detectors, weather forecasts, etc.). The use of diversity paths with system 212 can enable alternate routing capabilities, load balancing, increased load handling, concurrent bi-directional or synchronous communications, spread spectrum communications, etc.

It is noted that the use of the dielectric waveguide coupling devices of the communication nodes 214 in FIG. 2A are by way of example only, and that in other embodiments, other uses are possible. For instance, dielectric waveguide coupling devices can be used in a backhaul communication system, providing network connectivity to base station devices. Dielectric waveguide coupling devices can be used in many circumstances where it is desirable to transmit guided wave communications over a wire 210, whether insulated or not insulated. Dielectric waveguide coupling devices are improvements over other coupling devices due to no contact or limited physical and/or electrical contact with the wires 210 that may carry high voltages. With dielectric waveguide coupling devices, the apparatus can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, for example in configurations where the wires 210 correspond to a telephone network, cable television network, broadband data service, fiber optic communications system or other network employing low voltages or having insulated transmission lines 210.

It is further noted, that while a base station device and/or a macrocell site of a communication node 214 are described in an embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, Bluetooth protocol, Zigbee protocol or other wireless protocol.

According to an example embodiment, the electromagnetic waves traveling along the wire 210 and around the outer surface of the wire are induced by other electromagnetic waves traveling along a waveguide in proximity to the wire. The inducement of the electromagnetic waves can be independent of any electrical potential, charge or current that is injected or otherwise transmitted through the wires as part of an electrical circuit. It is to be appreciated that while a small current in the wire 210 may be formed in response to the propagation of the electromagnetic wave along the wire, this can be due to the propagation of the electromagnetic wave along the wire surface, and is not formed in response to electrical potential, charge or current that is injected into the wire as part of an electrical circuit. The electromagnetic waves traveling on the wire therefore do not require a circuit to propagate along the wire surface. The wire 210 therefore is a single wire transmission line that is not part of a circuit. Also, in some embodiments, a wire is not necessary, and the electromagnetic waves can propagate along a single line transmission medium that is not a wire.

Figure 2C:
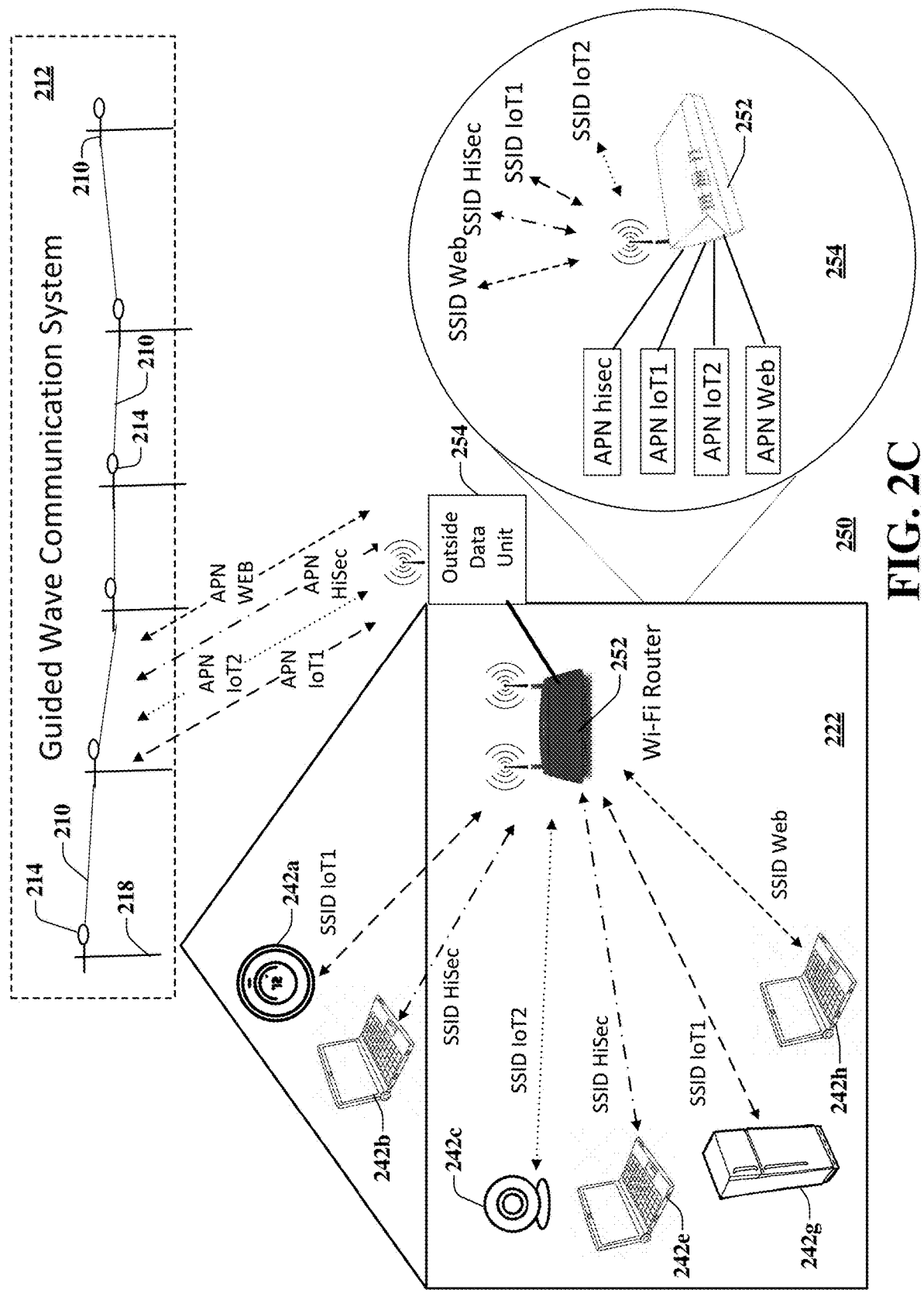
FIG. 2C is a block diagram illustrating an example, non-limiting embodiment of a system functioning within the communication network of FIG. 1 in accordance with various aspects described herein.

FIG. 2C is a block diagram illustrating an example, non-limiting embodiment of a system 250 functioning within the communication network 100 of FIG. 1 in accordance with various aspects described herein. The combined router/modem 248 of FIG. 2B is replaced with a WI-FI only router 252 (herein called Wi-Fi router 252) and an Outside Data Unit (ODU) 254 in FIG. 2C. In this embodiment, Wi-Fi router 252 can facilitate a WLAN for communications with the enterprise devices 242 using the differentiated set of SSIDs. The Wi-Fi router 252 can, in turn, communicate with the ODU 254 using, for example, a wired Ethernet link. The ODU 254 can perform the SSID-to-APN lookup to map each of the enterprise devices 242 to its proper differentiated APN for the cellular network. The ODU 254 reach the EPC 230 via wireless cellular communication with the communication node 214 of the guided wave communication system 212.

Figure 2D:
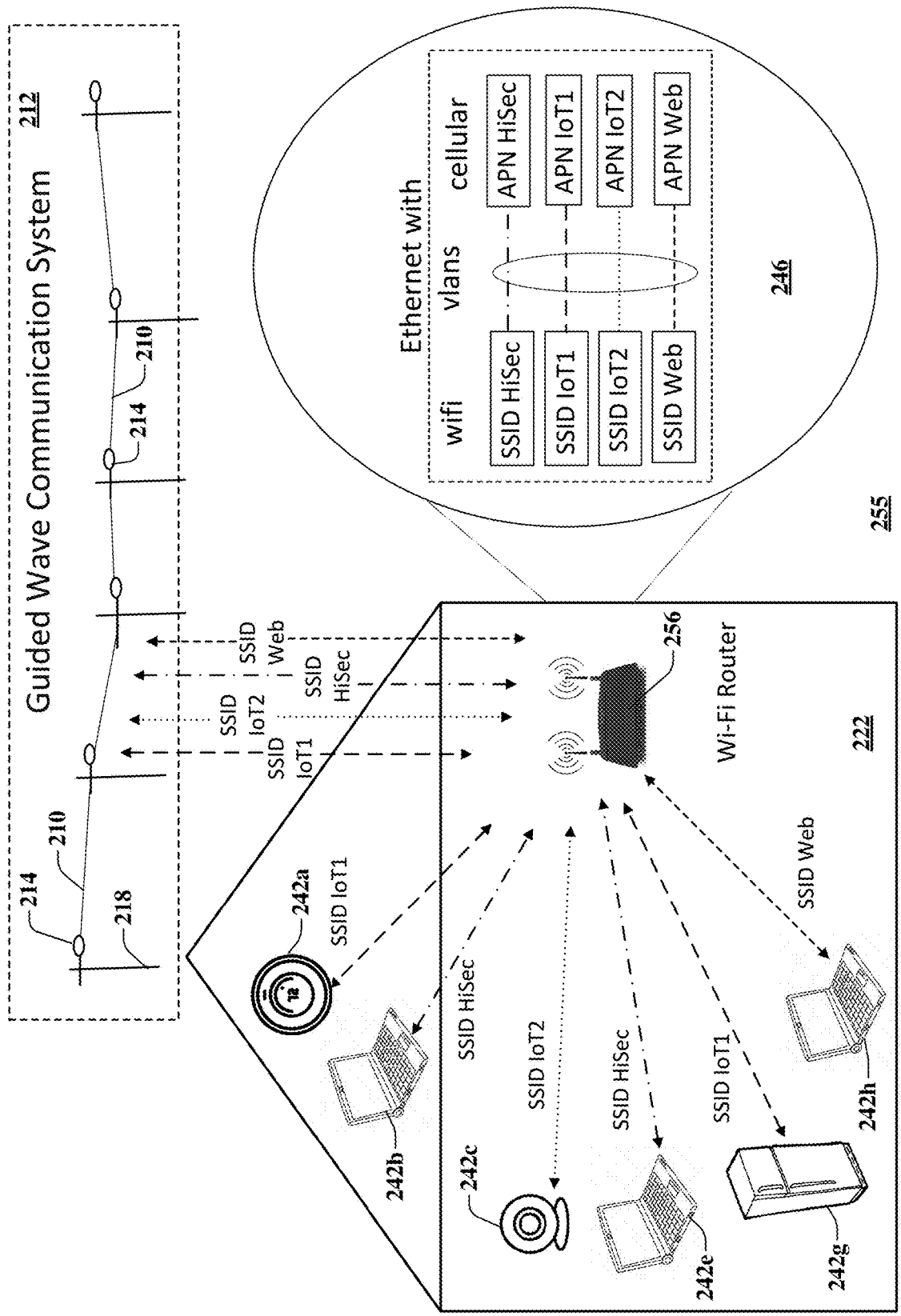
FIG. 2D is a block diagram illustrating an example, non-limiting embodiment of a system functioning within the communication network of FIG. 1 in accordance with various aspects described herein.

FIG. 2D is a block diagram illustrating an example, non-limiting embodiment of a system 255 functioning within the communication network 100 of FIG. 1 in accordance with various aspects described herein. The combined router/modem 248 of FIG. 2B is replaced with a WI-FI only router 252 (herein called Wi-Fi router 252), which communicates directly with a Wi-Fi transceiver in the communication node 214 of the guided wave communication system 212. The Outside Data Unit (ODU) 254 is not used. In this embodiment, the Wi-Fi router 256 can facilitate the WLAN for communications with the enterprise devices 242 using the differentiated set of SSIDs. The Wi-Fi router 256 can, in turn, also communicate with the communication node 214 using a Wi-Fi link. The close proximity of the communication node 214 of the guided wave communication system 212 facilitates this "Wi-Fi direct" connection of the enterprise 222. The Wi-Fi router 256 maintains the communications associated with the enterprise devices 242 in the Wi-Fi domain, using the assigned SSIDs. The communication node 214, in turn, can perform the SSID-to-APN lookup to map each of the enterprise devices 242 to its proper differentiated APN for the cellular network. Alternatively, the Wi-Fi router 256 can perform the SSID-to-APN and pass the correct APN for each device to the communication node 214, which can process of a cellular wireless message based on the APN.

Figure 2E:
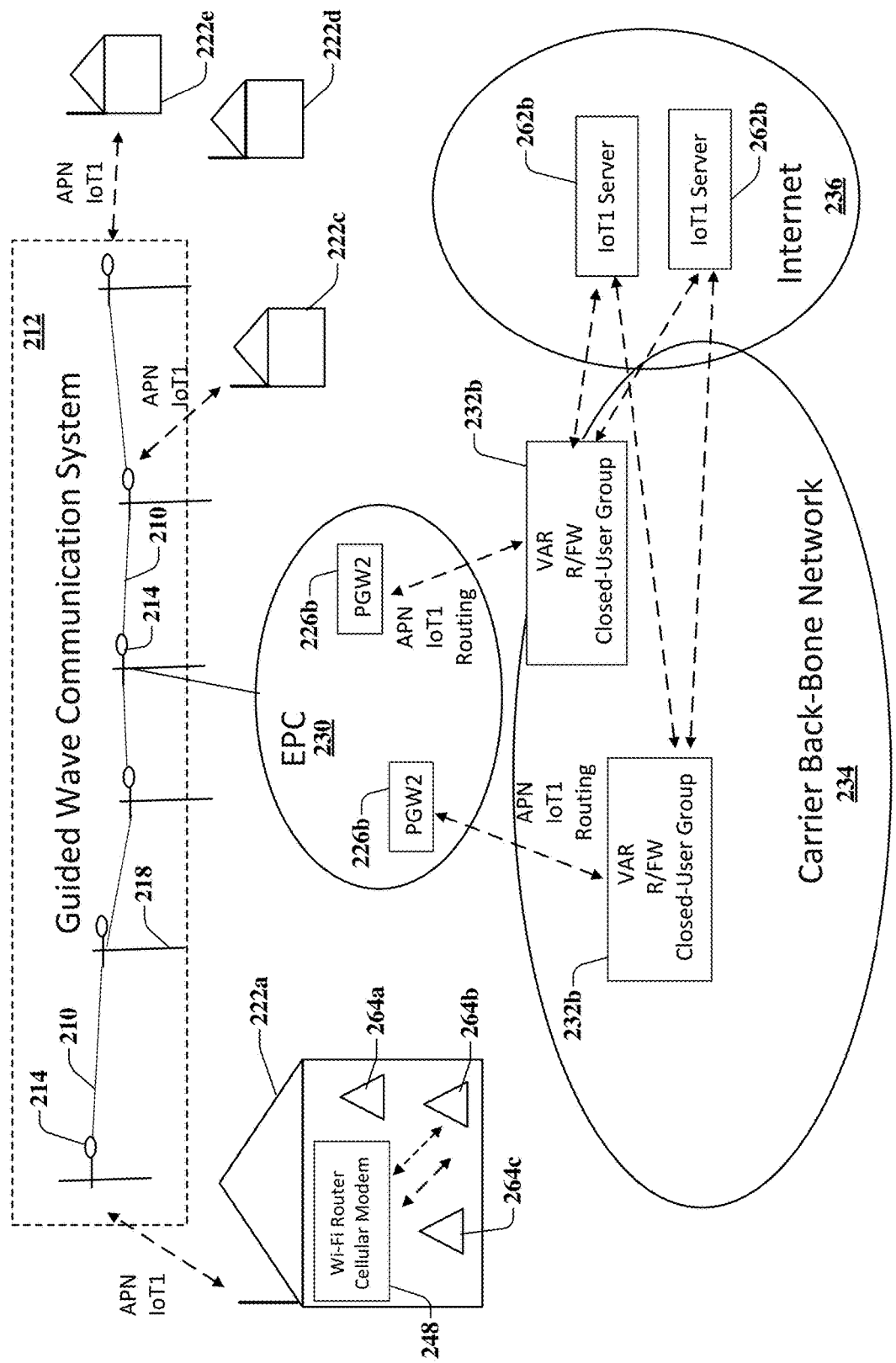
FIG. 2E is a block diagram illustrating an example, non-limiting embodiment of a system functioning within the communication network of FIG. 1 in accordance with various aspects described herein.

FIG. 2E is a block diagram illustrating an example, non-limiting embodiment of a system 260 functioning within the communication network 100 of FIG. 1 in accordance with various aspects described herein. An enterprise 222a includes several IoT devices 264a-c. For example, IoT devices 264a-c can be security cameras. A SSID for the IoT devices 264a-c can be mapped to APN IoT1 by the combined router/modem. The IoT devices 264 communicate with the EPC 230 of the cellular network via the guided wave communication system 212. The APN IoT1 routing causes the data for the IoT devices 264 to be routed to VARs for Routers/Firewalls for a Closed-User Group 232b and IoT servers 262b. To handle load balancing multiple VARs 232b and IoT servers 262b may be used with traffic shifting as needed. In one embodiment, restricted routing and firewall rules can be implemented in the network at the VAR 232b that is connected to the PGWd 226b. Restricted routing facilitates efficient and scalable configuration management via hub/servers and spoke/homes routing. For example, routing spokes cannot access other spokes. However, spokes can access only hubs that are allowed. It is easier to monitor such a restricted network for abuse and failures since only machine-to-machine communication is expected. The resulting routings and security features can prevent malicious use of the IoT devices 264 as bots for DDoS and other malicious activity.

In one embodiment, the combined router 248 provides a dedicated Wi-Fi band or beacon for the IoT devices 264. In one embodiment, the IoT servers 262b can belong to different vendors. The IoT servers 262b can push firewall rules up to the VAR Routers/FW 232b in the CBBN 234 in order to allow subscriber IoT devices 264 to access the IoT servers 262b. In one embodiment, the VAR Router/FW in the CBBN 234 can use a closed-user group type of routing table to restrict access to an IoT server set and to service subscribers. The availability of the separate/special APN IoT1 enables the routing to the closed group VARs 232b. This architecture scales well, because only PGW IP pools and IoT server IPs are present in the VAR 232b routing tables. As a result, here the IoT devices 264a-c can only access the IoT server 262b, but cannot access other "rogue" servers associated with botnet activities.

Figure 2F:
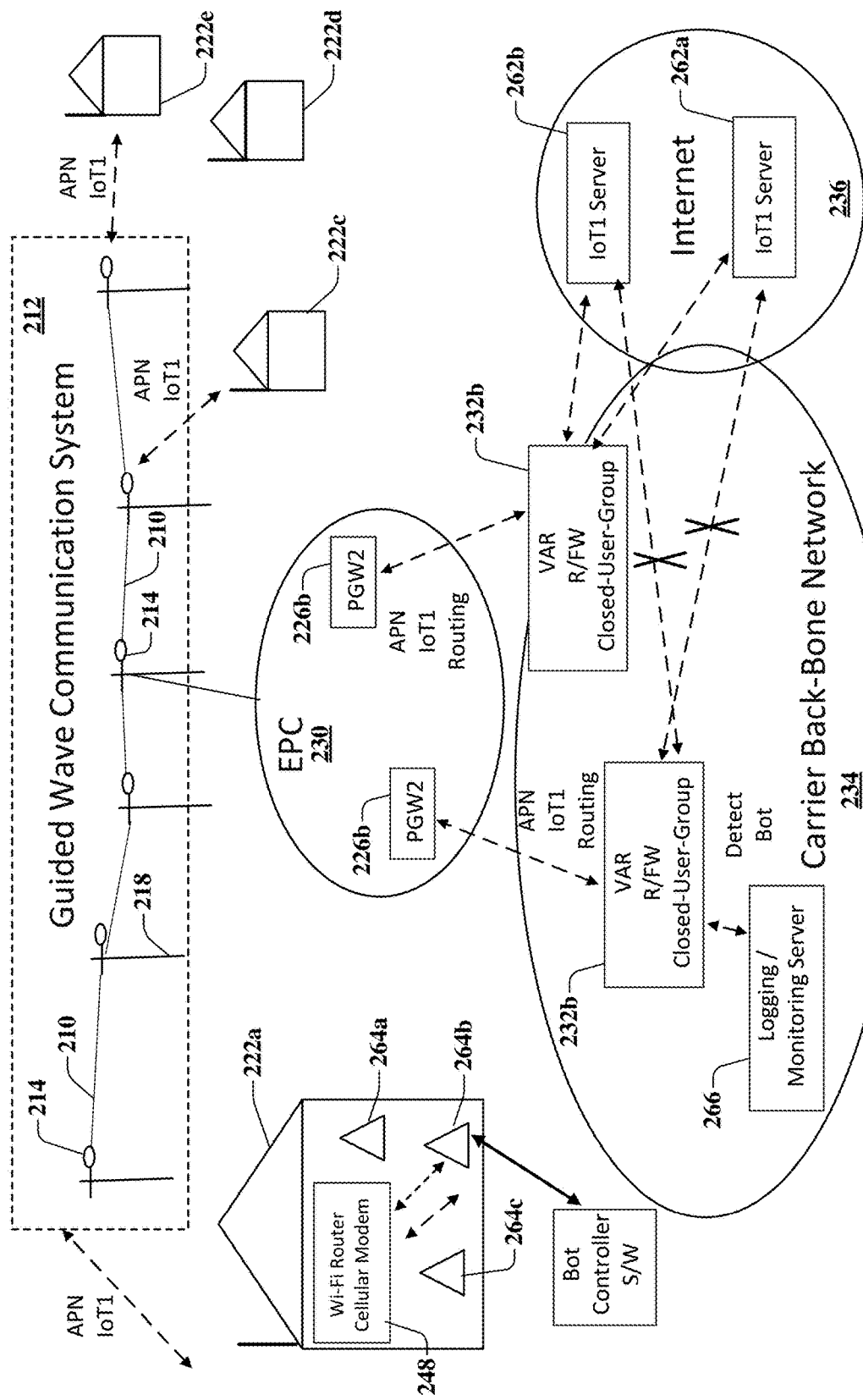
FIG. 2F is a block diagram illustrating an example, non-limiting embodiment of a system functioning within the communication network of FIG. 1 in accordance with various aspects described herein.

FIG. 2F is a block diagram illustrating an example, non-limiting embodiment of a system 260 functioning within the communication network 100 of FIG. 1 in accordance with various aspects described herein. If one of the IoT devices 264b becomes corrupted with bot controller software, then the VAR Router/FW 232b will detect the botnet, at the CBBN 234. Instead of allowing the infected IoT device 264b to access a bot controller on the Internet 236, the VAR Router/FW 232b stops the malicious communication at the CBBN 234. In one embodiment, the VAR Router/FW 232b can have a routing table for a closed-user group of subscribed IoT servers 262b and PGWs 226 that are assigned IP pools. In one example, no full routes are included in routing table. In one embodiment, a default route can be configured pointing to the logging/monitoring server 266 that records the packets involved in the malicious access attempt. In another embodiment, the default route can point to null to drop all packets attempting to reach destinations which are not specifically configured in the routing table. In another embodiment, the restricted routing table includes the logging/monitoring server 266, which can, alternatively, detect the infection of the device. So, not only can the infected IoT device 264b be disabled from getting to the Internet, it can also be logged as infected.

Figure 2G:
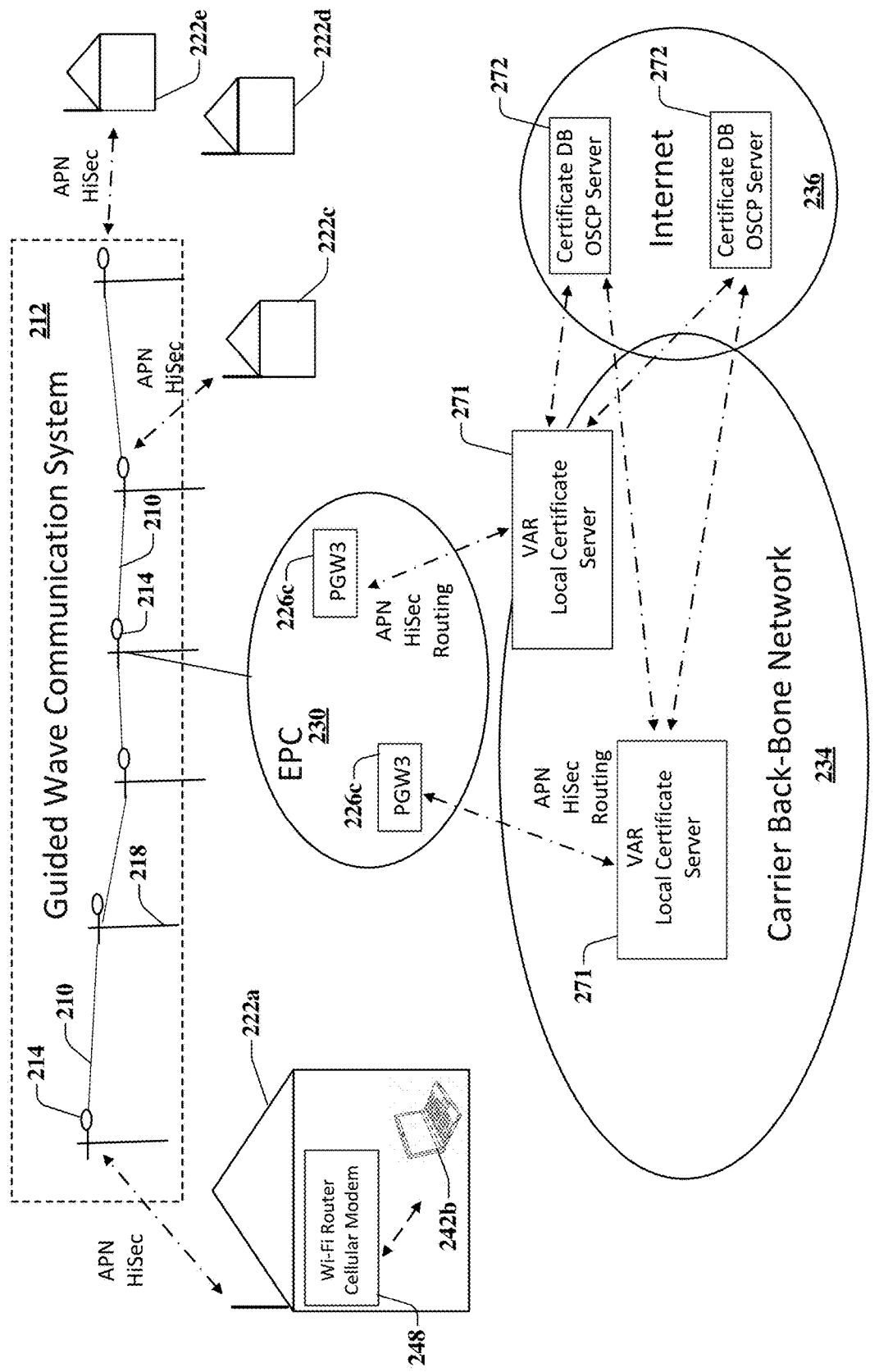
FIG. 2G is a block diagram illustrating an example, non-limiting embodiment of a system functioning within the communication network of FIG. 1 in accordance with various aspects described herein.

FIG. 2G is a block diagram illustrating an example, non-limiting embodiment of a system 270 functioning within the communication network 100 of FIG. 1 in accordance with various aspects described herein. In one or more embodiments, the combined router 248 can determine that a computer device 242b is running applications, which require high security routing features. The combination router 248 can assign an SSID of SSID HiSec to WLAN communications involving the computer device 242b. Further, the combined router 248 can perform an SSID-to-APN lookup to label cellular communications to the communication node 214 of the guided wave communication system 212 with an APN HiSec. As a result, the EPC 230 of the cellular system can route data for the computer device 242b though PGW3 226c and VAR Local Certificate Servers 271. The VAR Local Certificate Servers 271 can verify security certificates associated with communications involving the computer device 242b, where the verification is performed at the CBBN 234. Any problems with the certificates can be caught at the level of the CBBN 234, before entering the Internet 236.

Transport Layer Security (TLS) is a workhorse of for e-commerce, e-banking and, practically, all secure transactions on the Internet. TLS is based on Public Key Infrastructure (PKI) and RSA-type public certificates. Since these public certificates can be revoked by an issuer for various reasons, checking the status of a certificate in a timely manner is essential for guaranteeing confidentiality and integrity of transactions. Currently, both Certificate Revocation Lists (CRLs) and On-line Certificate Status Protocol (OCSP) are used to check validity of certs. Both these mechanisms have unresolved issues. For example, CRLs have become quite large, making download of the CRLs by clients slow or infeasible. Second, OCSP, which was initially proposed as a solution for real-time cert checking, has its own issues. For example, error messages of the protocol are not signed and, thus, can be used by third parties to create DoS attacks on OCSP. In addition, when a timely OCSP response is not received, some browsers fail-open (i.e., the browser assumes the certificate is valid). In one embodiment, the VAR Local Certificate Server 271 at the CBBN 234 uses a "localized CRL." The localized CRL can be much smaller than the global version that is used at the Internet level. As a result, the CRL can be effectively downloaded and checked at the CBBN 234. The localized CRL can include a set of certificates from "trusted partners" of the carrier.

Currently, different web browsers have implemented either CRLs or OCSP as their default method for checking validity of certs. Most use the second, non-default mechanism as a soft-fail option since neither method is reliable. In most cases, users cannot be relied on to take appropriate action when a certification verification failure warning is issued, and an option to either proceed with or abort the transaction is presented. Thus, there is a need for a reliable way to make TLS work for secure transactions. The close proximity of cellular communication nodes 214 afforded by the guided wave communication system 212 can allow an EPC and CBBN-based approach to be used to check validity of certificates in real-time. By limiting access to only a subset of sites similar to a closed-user-group, multiple modes are created for preventing MitM attacks that have long been used in phishing schemes and in on-line sales hacks. TLS in HTTP can get attacked, but by restricting routings to a closed-user-group, the opportunities for attacks are greatly reduced.

In one or more embodiments, VAR Local Certificate Servers 271 can connect to vendor certificate DBs over IP Security (IPSec) tunnels and can download CRLs periodically. The VAR Local Certificate Server 271 can then be used to check certificates downloaded by user browsers via the VAR Local Certificate Server 271. When a certificate being downloaded is flagged as revoked in the VAR Local Certificate Server 271, a firewall rule will block the download. In one embodiment, the VAR Local Certificate Server 271 can be given an Anycast IP address that can be identical to a certificate CRL distribution server or a corresponding OSCP server. In this mode, the users' browser can check certificate validity directly with the VAR Local Certificate Server 271. Because the routing is being restricted to verified banking sites, email servers, and so forth, the phishing email cannot route to the attacking server on the Internet 236.

Figure 2H:
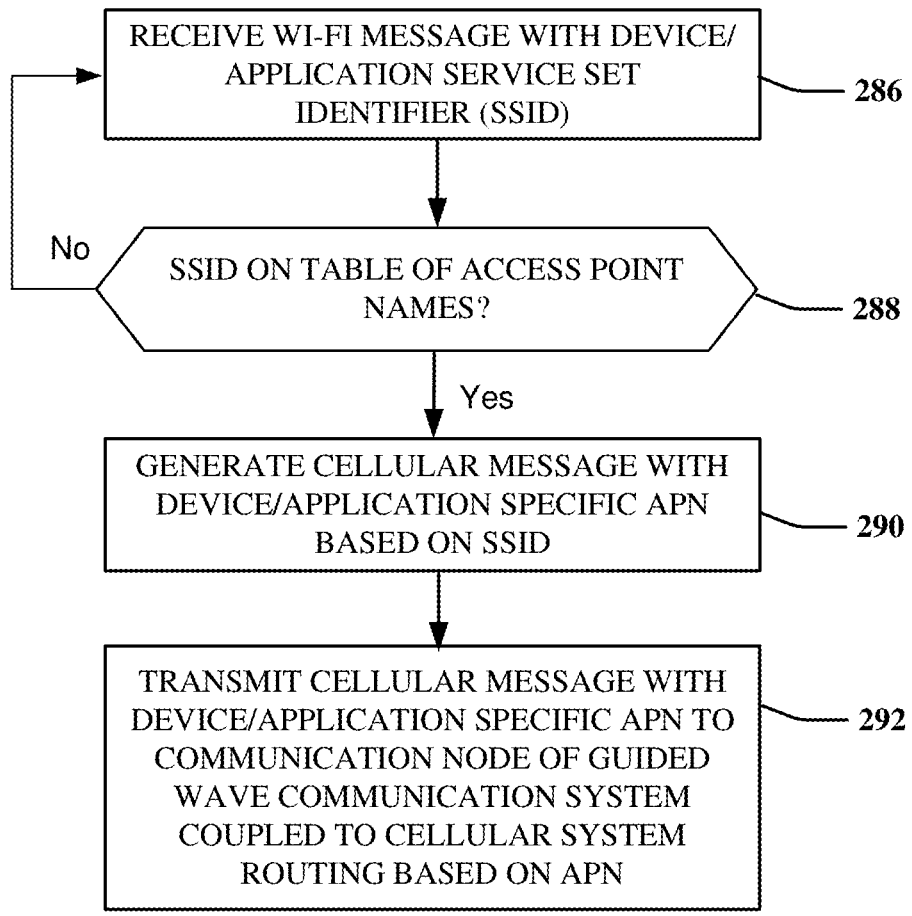
FIG. 2H depicts an illustrative embodiment of a method in accordance with various aspects described herein.

FIG. 2H depicts an illustrative embodiment of a method 275 in accordance with various aspects described herein. In step 286, a router at an enterprise can receive a Wi-Fi message with a device/application specific SSID. The SSID can be previously configured by the router in response to determining a MAC address of the device. The SSID can be derived from a set of SSID for a WLAN managed by the router. The SSID can correspond to a set of requirements for the device or the application running on the device. In step 288, the router can access an SSID-to-APN table to determine if the SSID is present. If the SSID is not present, the router can return to step 286 (and, optionally, assign a default SSID to the device/application). If the SSID is found, then the Router can return the corresponding APN and, in step 290, generate the specific APN for the device/application. In step 292, the router can transmit cellular messages to a communication node of a guided wave communication system that is coupled the cellular communication system. The cellular communication system routes data of the device/application based on the APN.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
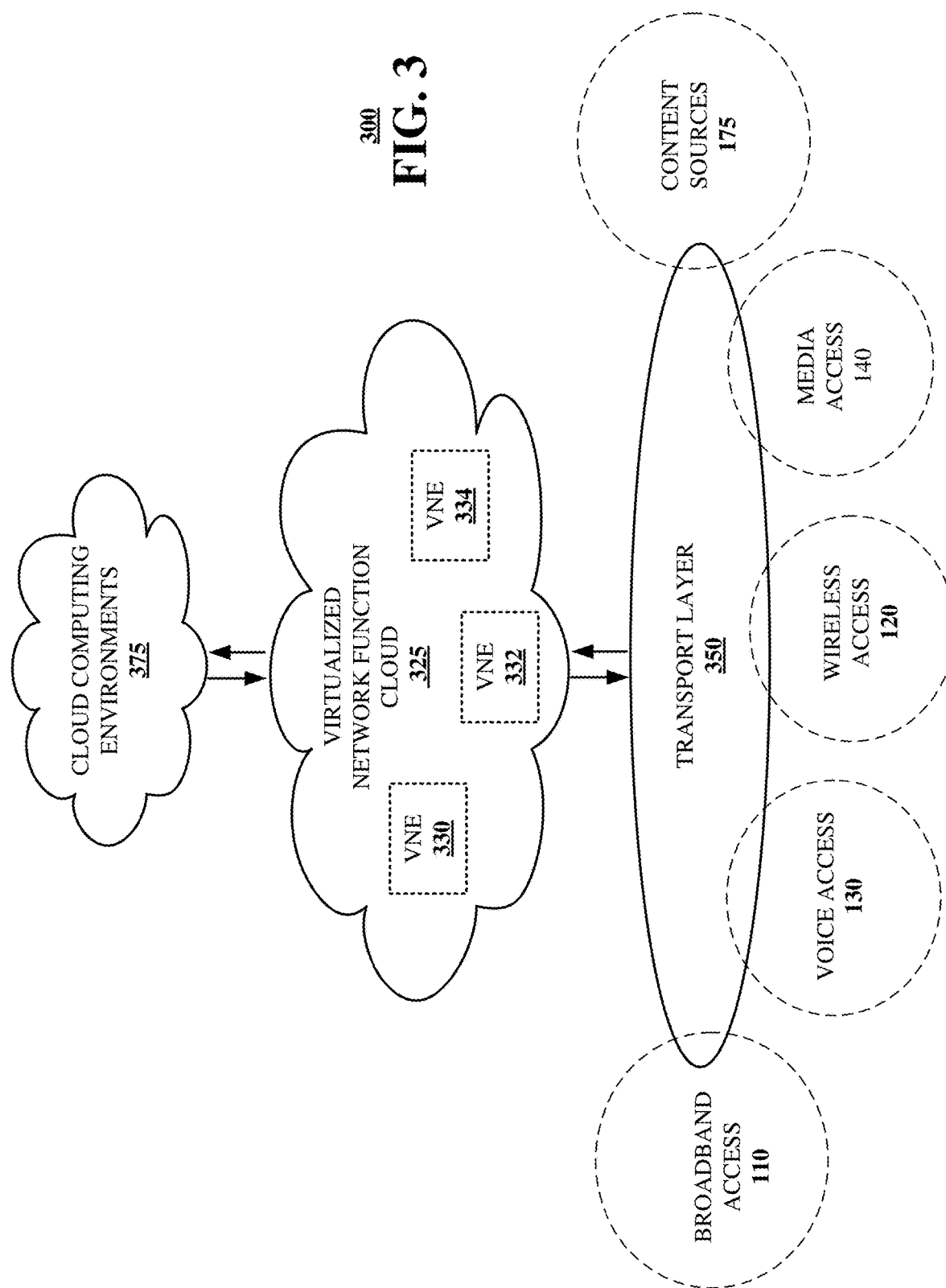
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200-270, and method 275 presented in FIGS. 1, 2A-2G, and 3.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
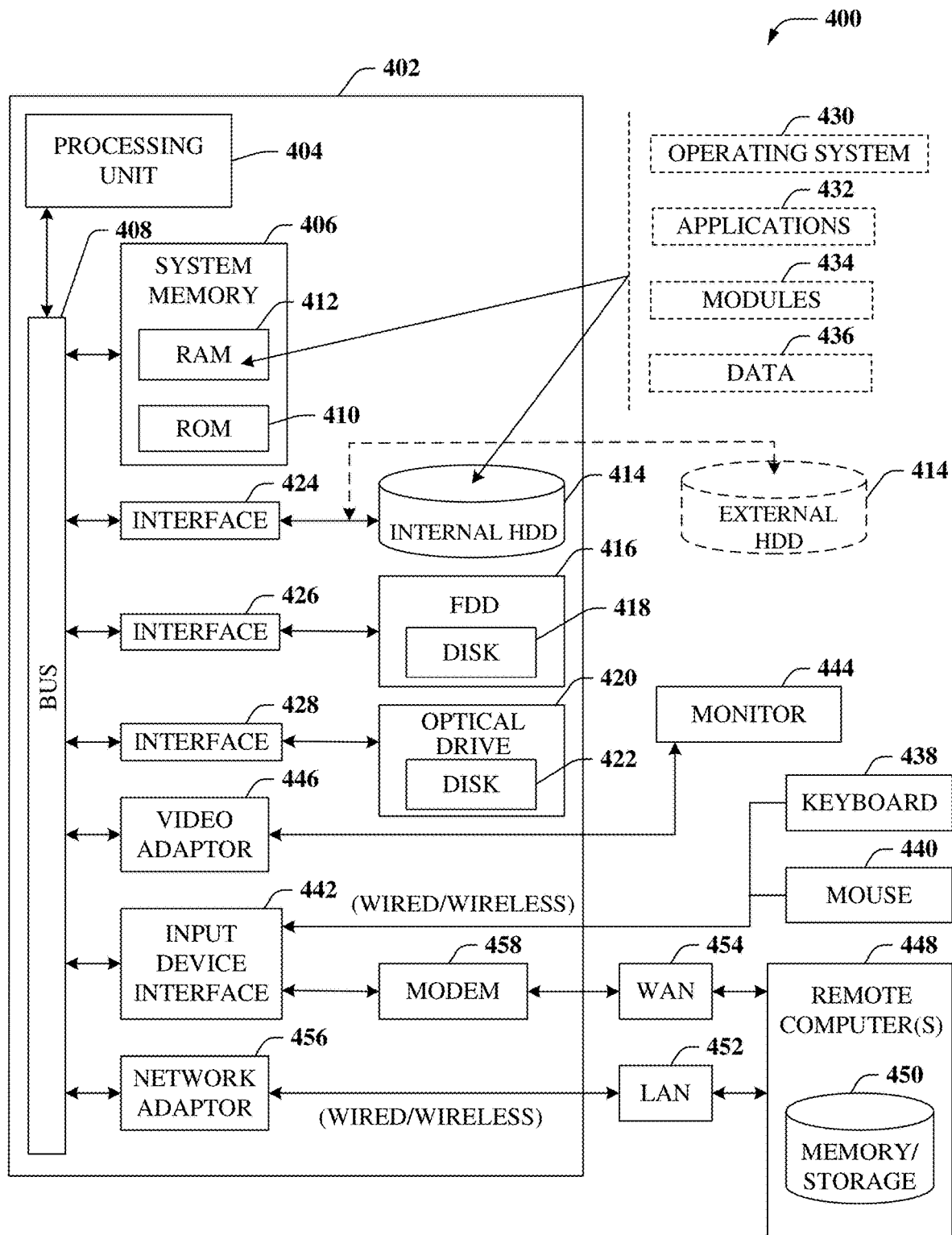
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software. For example, computing environment 400 can facilitate in whole or in part an apparatus for performing a method for identifying a device and/or an application running at a device with a service set identifier (SSID). The SSID can be one of several SSIDs supported by a router managing a Wi-Fi Local Area Network (WLAN) and can be based one or requirements of the device and/or application. An SSID-to-APN table can be used to translate the SSID into a corresponding APN for a cellular communication system. A message can be sent to a communication node of a guided wave communication system that is coupled to the cellular communication system. The cellular communication system can use the APN to generate a routing for meeting the requirements of the device and/or application.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
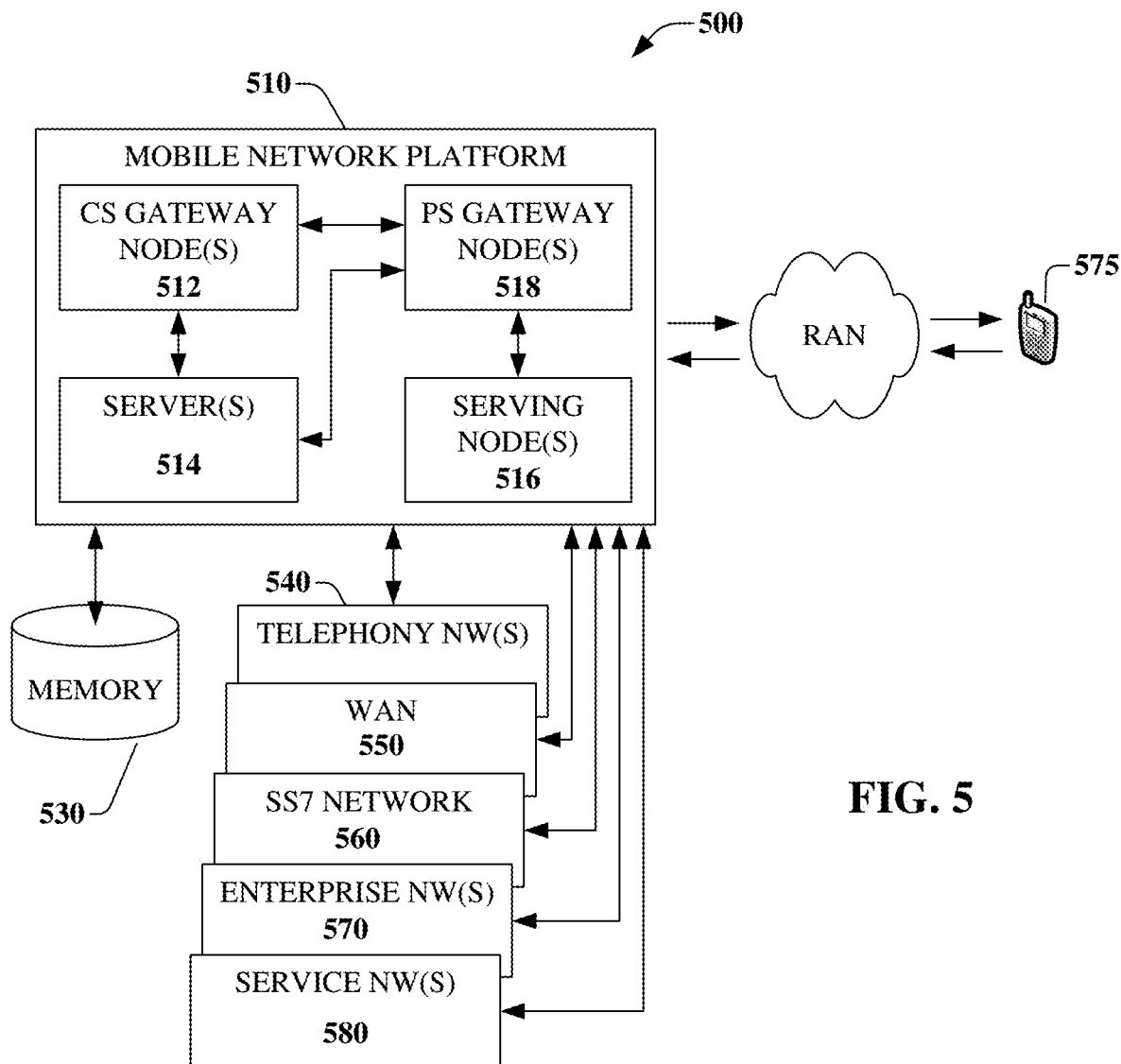
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. For example, platform 510 can facilitate in whole or in part an apparatus for performing a method for identifying a device and/or an application running at a device with a service set identifier (SSID). The SSID can be one of several SSIDs supported by a router managing a Wi-Fi Local Area Network (WLAN) and can be based one or requirements of the device and/or application. An SSID-to-APN table can be used to translate the SSID into a corresponding APN for a cellular communication system. A message can be sent to a communication node of a guided wave communication system that is coupled to the cellular communication system. The cellular communication system can use the APN to generate a routing for meeting the requirements of the device and/or application.

In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
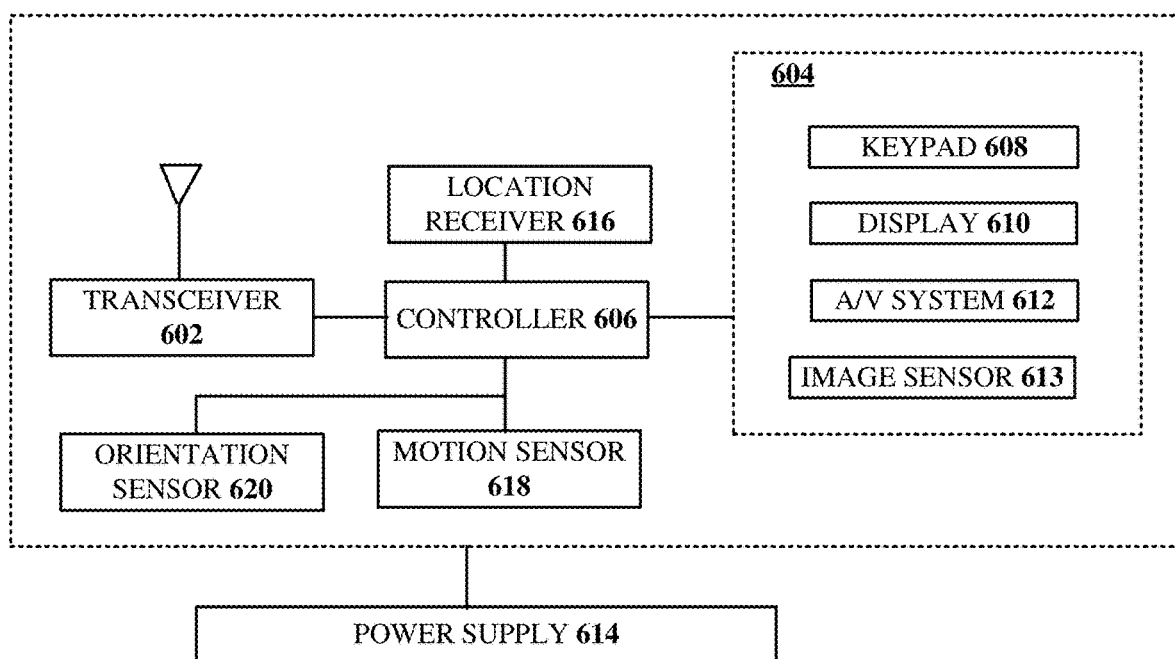
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part an apparatus for performing a method for identifying a device and/or an application running at a device with a service set identifier (SSID). The SSID can be one of several SSIDs supported by a router managing a Wi-Fi Local Area Network (WLAN) and can be based one or requirements of the device and/or application. An SSID-to-APN table can be used to translate the SSID into a corresponding APN for a cellular communication system. A message can be sent to a communication node of a guided wave communication system that is coupled to the cellular communication system. The cellular communication system can use the APN to generate a routing for meeting the requirements of the device and/or application.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to prognosticate or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A routing device, comprising:
   a Wi-Fi wireless transceiver;
   a cellular wireless transceiver;
   a processing system including a processor communicatively coupled to the Wi-Fi wireless transceiver and the cellular wireless transceiver; and
   a memory that stores executable instructions that, when executed by the processing system, facilitate performance of operations, the operations comprising:
      receiving, by the Wi-Fi wireless transceiver, a first message from a first device, wherein the first message includes a first service set identifier, and wherein the first service set identifier is included in a set of service set identifiers of a wireless local area network facilitated by the routing device;
      determining a first access point name according to the first service set identifier of the first message, wherein the first access point name is included in a set of access point names of a cellular communication system; and
      transmitting, by the cellular wireless transceiver, a second message to a communication node of a guided wave communication system, wherein the guided wave communication system is communicatively coupled to the cellular communication system, wherein the second message is associated with the first message and includes the first access point name, wherein the cellular communication system determines a first routing of first communications associated with the first device according to first access point name, and wherein the first routing of the first communications associated with the first device includes a first packet data network gateway associated with the first access point name.

2. The device of claim 1, wherein the operations further comprise:
   receiving, by the Wi-Fi wireless transceiver, a third message from the first device, wherein the third message includes a media access control address;
   assigning the first service set identifier to the first device according to the media access control address; and
   transmitting, by the Wi-Fi wireless transceiver, the first service set identifier to the first device.

3. The device of claim 2, wherein the operations further comprise determining a type of the first device according to the media access control address, wherein the assigning of the first service set identifier is further according to the type of the first device.

4. The device of claim 1, wherein the first routing of the first communications associated with the first device restricts the first communications to a first closed-user group associated with the first access point name.

5. The device of claim 1, wherein the first routing of the first communications associated with the first device includes a first firewall associated with first access point name.

6. The device of claim 1, wherein the first routing of the first communications associated with the first device includes a process to monitor security certificates associated with the first communications according to the first access point name.

7. The device of claim 1, wherein the operations further comprise receiving, by the Wi-Fi wireless transceiver, a third message from a second device, wherein the third message includes a second service set identifier, and wherein the second service set identifier is further included in the set of service set identifiers of the wireless local area network facilitated by the routing device.

8. The device of claim 1, wherein the operations further comprise determining a second access point name according to a second service set identifier of a third message received, by the Wi-Fi wireless transceiver, from a second device, and wherein the second access point name is further included in the set of access point names of the cellular communication system.

9. The device of claim 1, wherein the operations further comprise transmitting, by the cellular wireless transceiver, a fourth message to the cellular communication system, wherein the fourth message is associated with a third message received, by the Wi-Fi wireless transceiver, from a second device, wherein the fourth message includes a second access point name determined from the third message, and wherein the cellular communication system further determines a second routing of second communications associated with the second device according to the second access point name.

10. The device of claim 1, wherein the guided wave communication system is further communicatively coupled to the cellular communication system via transmission of first electromagnetic waves associated with the first communications along a transmission medium associated with the guided wave communication system, wherein the first electromagnetic waves propagate along the transmission medium without requiring an electrical return circuit.

11. A non-transitory machine-readable medium, comprising executable instructions that, when executed by a processing system including a processor, facilitate performance of operations, the operations comprising:
- receiving, by a Wi-Fi wireless transceiver, a first message from a first device, wherein the first message includes a first service set identifier, and wherein the first service set identifier is included in a set of service set identifiers of a wireless local area network;
- determining a first access point name according to the first service set identifier of the first message, wherein the first access point name is included in a set of access point names of a cellular communication system; and
- transmitting, by the Wi-Fi wireless transceiver, a second message to a communication node of a guided wave communication system, wherein the guided wave communication system is communicatively coupled to the cellular communication system, wherein the second message is associated with the first message and includes the first access point name, and wherein the cellular communication system determines a first routing of first communications associated with the first device according to first access point name.

12. The non-transitory machine-readable medium of claim 11, wherein the first routing of the first communications associated with the first device includes a first packet data network gateway associated with the first access point name.

13. The non-transitory machine-readable medium of claim 11, wherein the operations further comprise determining a type of the first device according to a media access control address included in a third message, wherein the determining of the first service set identifier is further according to the type of the first device.

14. The non-transitory machine-readable medium of claim 11, wherein the first routing of the first communications associated with the first device restricts the first communications to a first closed-user group associated with the first access point name.

15. The non-transitory machine-readable medium of claim 11, wherein the first routing of the first communications associated with the first device includes a first firewall associated with first access point name.

16. The non-transitory machine-readable medium of claim 11, wherein the first routing of the first communications associated with the first device includes a process to monitor security certificates associated with the first communications according to the first access point name.

17. The non-transitory machine-readable medium of claim 11, wherein the guided wave communication system is further communicatively coupled to the cellular communication system via transmission of first electromagnetic waves associated with the first communications along a transmission medium associated with the guided wave communication system, wherein the first electromagnetic waves propagate along the transmission medium without requiring an electrical return circuit.

18. A method, comprising:
- determining, by a processing system including a processor, a first access point name according to a first service set identifier associated with of a first wireless message transmitted according to a first wireless protocol from a first device, wherein the first access point name is included in a set of access point names of a cellular communication system; and
- transmitting, by the processing system, a second wireless message according to a second wireless protocol to a communication node of a guided wave communication system, wherein the guided wave communication system is communicatively coupled to the cellular communication system, wherein the second wireless message is associated with the first wireless message and includes the first access point name, wherein the cellular communication system determines a first routing of first communications associated with the first device according to first access point name.

19. The method of claim 18, wherein the first wireless protocol is capable of Wi-Fi wireless communication and the second wireless protocol is capable of cellular wireless communication.

20. The method of claim 18, wherein the first routing of the first communications associated with the first device restricts the first communications to a first closed-user group associated with the first access point name, includes a first firewall associated with first access point name, includes a process to monitor security certificates associated with the first communications according to the first access point name, or any combination thereof.

* * * * *